(12) United States Patent
Yang et al.

(10) Patent No.: US 12,051,936 B2
(45) Date of Patent: Jul. 30, 2024

(54) SELF-POWERED POWER SUPPLY DRIVE CIRCUIT AND CHIP

(71) Applicant: Fremont Micro Devices Corporation, Guangdong (CN)

(72) Inventors: Xueren Yang, Guangdong (CN); Chong Huang, Guangdong (CN); Kelvin Yupak Hui, Guangdong (CN)

(73) Assignee: Fremont Micro Devices Corporation, Shenzhen (CN)

( * ) Notice: Subject to any disclaimer, the term of this patent is extended or adjusted under 35 U.S.C. 154(b) by 246 days.

(21) Appl. No.: 17/869,084

(22) Filed: Jul. 20, 2022

(65) Prior Publication Data

US 2023/0299607 A1 Sep. 21, 2023

(30) Foreign Application Priority Data

Mar. 16, 2022 (CN) .......................... 202210262301.6

(51) Int. Cl.
*H02M 1/36* (2007.01)
*H02J 7/00* (2006.01)
(Continued)

(52) U.S. Cl.
CPC ................ *H02J 7/02* (2013.01); *H02J 7/007* (2013.01); *H02M 1/0032* (2021.05); *H02M 1/36* (2013.01);
(Continued)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247;
(Continued)

(56) References Cited

U.S. PATENT DOCUMENTS 7,135,845 B2 * 11/2006 Zverev ................ H02M 1/4225
323/284
2022/0123657 A1 * 4/2022 Hui .......................... H02M 1/08
(Continued)

*Primary Examiner* — Thienvu V Tran
*Assistant Examiner* — Nusrat Quddus

(57) ABSTRACT

Disclosed by present disclosure are a self-powered power supply drive circuit and a self-powered power supply drive chip. The self-powered power supply drive circuit includes a charging detection circuit, a current sampling switch tube, a charging switch tube, a sampling circuit and a control circuit. The drive tube and current sampling switch tube, which are connected in series, are connected between the input power supply and the ground. The current sampling switch tube is switched off and the charging switch tube is switched on during the pre-switching-off stage, such that the current which flows through the drive tube during the pre-switching-off stage is used to charge the energy storage circuit. The charging time is in the pre-switching-off stage, which never affects the normal switching cycle of the drive tube itself and the normal output of energy. Moreover, this way of charging does not require any additional auxiliary coil winding.

20 Claims, 6 Drawing Sheets

(51) Int. Cl.
*H02J 7/02* (2016.01)
*H02M 1/00* (2006.01)
*H02M 3/335* (2006.01)

(52) U.S. Cl.
CPC ..... *H02M 3/33569* (2013.01); *H02J 2207/20* (2020.01)

(58) Field of Classification Search
CPC .......... G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/32; H02M 2001/322; H02M 2001/327; H02M 1/34; H02M 2001/342; H02M 2001/344; H02M 2001/346; H02M 2001/348; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H05B 39/048; B23K 11/24; H04B 2215/069; Y02B 70/1491; H02J 3/46; H02J 3/38
See application file for complete search history.

(56) References Cited

U.S. PATENT DOCUMENTS

2023/0029050 A1* 1/2023 Huang ..................... H02M 1/08
2023/0299766 A1* 9/2023 Huang ............. H03K 17/04126
327/575

* cited by examiner

SELF-POWERED POWER SUPPLY DRIVE CIRCUIT AND CHIP

CROSS REFERENCE TO RELATED APPLICATIONS

The present application claims the benefit of Chinese Patent Application No. 202210262301.6 filed on Mar. 16, 2022, the contents of which are incorporated herein by reference in their entirety.

TECHNICAL FIELD

The present disclosure relates generally to a power supply technical field, and more particularly relates to a self-powered power supply drive circuit and a self-powered power supply drive chip.

BACKGROUND

AC-DC chip, which is configured to convert alternating current (AC) voltage to direct current (DC) voltage, needs electrical power to operate normally. Therefore, it is necessary to design a power supply circuit to supply electrical power to the chip. FIG. 1 is a block diagram of a traditional second side regulation (SSR) topology AC-DC circuit, and its operation process is as follows. When the input power Vin is powered up, the capacitor C is charged through the resistor Rstart. The VCC detection circuit detects the capacitor voltage VCC of the capacitor C in real time and outputs a signal VCC_ON to trigger the AC-DC chip to start operation when the capacitor voltage VCC satisfies a preset requirement. As the standby system power consumption has strict requirements, the resistance value of the resistor Rstart is very large and its charging current cannot satisfy the operation current of the AC-DC chip. Accordingly, an auxiliary coil winding is required to supply electrical power to the AC-DC chip, where the coil number of the primary coil winding Np, the coil number of the secondary coil winding Ns, and the coil number of the auxiliary coil winding Na, satisfy Np/Ns=n, Np/Na=m. The operation principle of electrical power supply through the auxiliary coil winding is as follows. When the switch tube M1 is switched on, voltage at both terminals of the primary coil winding of the transformer changes to Vin. According to the characteristics of the transformer, at this time:

$$V_s = -\frac{V_{in}}{n}, V_a = -\frac{V_{in}}{m};$$

wherein Vs represents voltage at both terminals of the secondary coil winding of the transformer, Va represents voltage at both terminals of the auxiliary coil winding of the transformer.

When the switch tube M1 is switched off, $V_S=V_O+V_{D1}$, $$V_a = V_s * \frac{m}{n} = (V_o + V_{D1}) * \frac{m}{n};$$

wherein Vo represents an output voltage of the AC-DC chip, $V_{D1}$ represents voltage drop between anode and cathode of diode D1.

The auxiliary coil winding can be designed according to the required capacitor voltage VCC. The capacitor C is charged through the auxiliary coil winding in the secondary discharge stage to guarantee the normal operation of the AC-DC chip. The current relationship is as follows $I_L*N_P=I_S*N_S+I_a*N_a$; wherein $I_L$ represents current flowing into the drain of the switch tube M1, $I_S$ represents current flowing into the anode of the diode D1.

This method requires an additional auxiliary coil winding for electrical power supply, and an additional diode D2 for cutting off the current path to prevent the capacitor C from reverse discharging when the switch tube M1 at primary side is switched on. When such method is applied to the charger with PPS protocol of PD 3.0, the output voltage Vo ranges from 3.3V~20V. When the capacitor voltage VCC of capacitor C is used to drive the switch tube M1, the minimum operation voltage of the capacitor voltage VCC is 10V. Therefore, the minimum value of m/n is 3. When the output voltage is 20V, the minimum operation voltage of the capacitor voltage VCC reaches 60V, which has high requirements for process and large IC power consumption.

SUMMARY

The present disclosure has provided a self-powered power supply drive circuit and a self-powered power supply drive chip without requiring any additional auxiliary coil winding, aiming at the technical problems of process, power consumption and cost, which are caused by the above electrical power supply through the additional auxiliary coil winding in the prior art.

According to a first aspect, a self-powered power supply drive circuit is provided, which including:
- a charging detection circuit, which is connected with an energy storage circuit, and is configured to detect a power supply voltage of the energy storage circuit and to generate a self-charging signal when the power supply voltage is smaller than a self-charging threshold;
- a current sampling switch tube, which is connected with an output terminal of a drive tube, wherein an input terminal of the drive tube is connected with an input power supply and the output terminal of the drive tube is grounded through the current sampling switch tube;
- a charging switch tube, wherein an input terminal of the charging switch tube is connected between the drive tube and the current sampling switch tube, and an output terminal of the charging switch tube is connected with the energy storage circuit;
- a sampling circuit, wherein an input terminal of the sampling circuit is connected between the drive tube and the current sampling switch tube to acquire a current which flows from the drive tube to the current sampling switch tube for generating a sampled voltage; and
- a control circuit, which is connected with an output terminal of the sampling circuit to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;
- wherein, each time the control circuit enters the switching-on cycle, if the control circuit fails to receive the self-charging signal, the control circuit is configured to be in a first switching-on control state after entering the switching-on cycle, wherein the first switching-on control state represents switching on the current sampling switch tube and switching off the charging switch tube;

wherein, each time the control circuit enters the switching-on cycle, if the control circuit receives the self-charging signal, the control circuit is configured to be in a first switching-on control state at an early stage after entering the switching-on cycle, and to be switched to a second switching-on control state in a later pre-switching-off stage to use a current which flows through the drive tube during the pre-switching-off stage to charge the energy storage circuit; wherein the pre-switching-off stage represents a period of the switching-on cycle which is from starting driving the drive tube to completely switching off the drive tube; the second switching-on control state represents switching off the current sampling switch tube and switching on the charging switch tube.

Preferably, the self-powered power supply drive circuit further includes:

a current input circuit, which is connected with a control terminal of the drive tube and is configured to input a drive current to switch on the drive tube; and a discharging circuit, which is connected with the control terminal of the drive tube and is configured to discharge the control terminal of the drive tube;

wherein, each time the control circuit enters the switching-on cycle, if the control circuit fails to receive the self-charging signal, the control circuit is specifically configured to be in the first switching-on control state after entering the switching-on cycle, to switch off the current input circuit to stop driving the drive tube when the sampled voltage reaches a first reference voltage, and to switch off the current sampling switch tube and synchronously control the discharging circuit to discharge to forcibly and completely switch off the drive tube to enable the drive tube to enter the switching-off cycle when the sampled voltage continues to increase to a second reference voltage;

wherein, each time the control circuit enters the switching-on cycle, if the control circuit receives the self-charging signal, the control circuit is specifically configured to be in the first switching-on control state at an early stage after entering the switching-on cycle, and to record a time, which is costed by the sampled voltage to increase from a third reference voltage to the first reference voltage, as a charging reference duration of a current switching-on cycle, and to acquire a charging execution duration based on the charging reference duration, to switch off the current input circuit to stop driving the drive tube when the sampled voltage reaches the first reference voltage, and to switch to the second switching-on control state and start timing at a same time when stop driving the drive tube, and to switch off the charging switch tube and synchronously control the discharging circuit to discharge to forcibly and completely switch off the drive tube to enable the drive tube to enter the switching-off cycle when the timed time reaches the charging execution duration.

Preferably, the charging execution duration and the charging reference duration satisfy following equation:

$$(Vref2-Vref1)/tcharge=(Vref1-Vref3)/t1;$$

wherein t1 represents the charging reference duration, tcharge represents the charging execution duration, Vref1 represents the first reference voltage, Vref2 represents the second reference voltage, and Vref3 represents the third reference voltage.

Preferably, the self-powered power supply drive circuit further includes a power supply direct-charging circuit, which is connected between the input terminal of the drive tube and the energy storage circuit, and is configured to directly take electrical power from the input power supply to charge the energy storage circuit until the power supply voltage is larger than a chip startup threshold, and to directly take electrical power from the input power supply to charge the energy storage circuit and guarantee that the power supply voltage is larger than the chip startup threshold when an operation of the drive tube cannot satisfy a self-powered demand.

Preferably, the drive tube is a Darlington transistor, which includes a primary transistor and a secondary transistor, wherein the discharging circuit includes a first discharging switch and a second discharging switch; wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

Preferably, the current input circuit includes a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

Preferably, the control circuit includes a first PWM comparator, a second PWM comparator, a third PWM comparator and a logic circuit, wherein:

one input terminal of the third PWM comparator is connected with the third reference voltage, and the other input terminal of the third PWM comparator is connected with the output terminal of the sampling circuit, wherein the third PWM comparator is configured to output a third trigger signal when the sampled voltage increases to the third reference voltage;

one input terminal of the first PWM comparator is connected with the first reference voltage, and the other input terminal of the first PWM comparator is connected with the output terminal of the sampling circuit, wherein the first PWM comparator is configured to output a first trigger signal when the sampled voltage increases to the first reference voltage;

one input terminal of the second PWM comparator is connected with the second reference voltage, and the other input terminal of the second PWM comparator is connected with the output terminal of the sampling circuit, wherein the second PWM comparator is configured to output a second trigger signal when the sampled voltage increases to the second reference voltage;

the logic circuit is respectively connected with the first comparator, the second PWM comparator, the third PWM comparator, the charging detection circuit, the current sampling switch tube, the current input circuit and the discharging circuit.

Preferably, each time the logic circuit enters the switching-on cycle, if the logic circuit fails to receive the self-charging signal, the logic circuit is configured to firstly switch on the current sampling switch tube and switch off the charging switch tube after entering the switching-on cycle, to switch off the current input circuit when receiving the first trigger signal, and to switch off the current sampling switch tube and synchronously control the discharging circuit to discharge when receiving the second trigger signal;

each time the logic circuit enters the switching-on cycle, if the logic circuit receives the self-charging signal, the logic circuit is configured to firstly switch on the current sampling switch tube and switch off the charging switch tube after entering the switching-on cycle, to start a first timing when receiving the third trigger signal, to end the first timing to acquire the charging reference duration when receiving the first trigger signal, to start a second timing, and synchronously switch off the current input circuit and the current sampling switch tube and switch on the charging switch tube at a same time when ending the first timing, and to switch off the charging switch tube and synchronously control the discharging circuit to discharge when the second timing reaches the charging execution duration.

Preferably, the sampling circuit further includes a controlled terminal which is connected with a controlled terminal of the current sampling switch tube, wherein both controlled terminals are connected with the control circuit, such that the control circuit is configured to synchronously control the sampling circuit to sample when controlling the current sampling switch tube to be switched on, and to synchronously control the sampling circuit to stop sampling when controlling the current sampling switch tube to be switched off.

Preferably, the sampling circuit includes an error amplifier, a sampling start switch, a first current mirror switch and a second current mirror switch which constitute a current mirror, a reference current switch, and a sampling resistor; wherein a first input terminal of the error amplifier is connected between the drive tube and the current sampling switch tube, and a second input terminal of the error amplifier is grounded through the sampling start switch, control terminals of the sampling start switch and the current sampling switch tube are connected with the control circuit, an output terminal of the error amplifier is connected with a control terminal of the reference current switch, an output terminal of the first current mirror switch is connected between the sampling start switch and the second input terminal of the error amplifier through the reference current switch, and an output terminal of the second current mirror switch is connected with a first terminal of the sampling resistor, wherein the first terminal of the sampling resistor is further connected with the control circuit, and a second terminal of the sampling resistor is grounded.

According to a second aspect, a self-powered power supply drive chip, is provided, which including a self-powered power supply drive circuit and a drive tube,
  wherein the self-powered power supply drive circuit further includes:
  a charging detection circuit, which is connected with an energy storage circuit, and is configured to detect a power supply voltage of the energy storage circuit and to generate a self-charging signal when the power supply voltage is smaller than a self-charging threshold;
  a current sampling switch tube, which is connected with an output terminal of the drive tube, wherein an input terminal of the drive tube is connected with an input power supply and the output terminal of the drive tube is grounded through the current sampling switch tube;
  a charging switch tube, wherein an input terminal of the charging switch tube is connected between the drive tube and the current sampling switch tube, and an output terminal of the charging switch tube is connected with the energy storage circuit;
  a sampling circuit, wherein an input terminal of the sampling circuit is connected between the drive tube and the current sampling switch tube to acquire a current which flows from the drive tube to the current sampling switch tube for generating a sampled voltage; and
  a control circuit, which is connected with an output terminal of the sampling circuit to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;
  wherein, each time the control circuit enters the switching-on cycle, if the control circuit fails to receive the self-charging signal, the control circuit is configured to be in a first switching-on control state after entering the switching-on cycle, wherein the first switching-on control state represents switching on the current sampling switch tube and switching off the charging switch tube;
  wherein, each time the control circuit enters the switching-on cycle, if the control circuit receives the self-charging signal, the control circuit is configured to be in a first switching-on control state at an early stage after entering the switching-on cycle, and to be switched to a second switching-on control state in a later pre-switching-off stage to use a current which flows through the drive tube during the pre-switching-off stage to charge the energy storage circuit; wherein the pre-switching-off stage represents a period of the switching-on cycle which is from starting driving the drive tube to completely switching off the drive tube; the second switching-on control state represents switching off the current sampling switch tube and switching on the charging switch tube.

Preferably, the self-powered power supply drive circuit further includes:
  a current input circuit, which is connected with a control terminal of the drive tube and is configured to input a drive current to switch on the drive tube; and
  a discharging circuit, which is connected with the control terminal of the drive tube and is configured to discharge the control terminal of the drive tube;
  wherein, each time the control circuit enters the switching-on cycle, if the control circuit fails to receive the self-charging signal, the control circuit is specifically configured to be in the first switching-on control state after entering the switching-on cycle, to switch off the current input circuit to stop driving the drive tube when the sampled voltage reaches a first reference voltage, and to switch off the current sampling switch tube and synchronously control the discharging circuit to discharge to forcibly and completely switch off the drive tube to enable the drive tube to enter the switching-off cycle when the sampled voltage continues to increase to a second reference voltage;
  wherein, each time the control circuit enters the switching-on cycle, if the control circuit receives the self-charging signal, the control circuit is specifically configured to be in the first switching-on control state at an early stage after entering the switching-on cycle, and to record a time, which is costed by the sampled voltage to increase from a third reference voltage to the first reference voltage, as a charging reference duration of a current switching-on cycle, and to acquire a charging execution duration based on the charging reference duration, to switch off the current input circuit to stop driving the drive tube when the sampled voltage reaches the first reference voltage, and to switch to the second switching-on control state and start timing at a same time when stop driving the drive tube, and to switch off the charging switch tube and synchronously control the discharging circuit to discharge to forcibly and completely switch off the drive tube to enable the drive tube to enter the switching-off cycle when the timed time reaches the charging execution duration.

Preferably, the charging execution duration and the charging reference duration satisfy following equation:

(Vref2−Vref1)/tcharge=(Vref1−Vref3)/t1;

wherein t1 represents the charging reference duration, tcharge represents the charging execution duration, Vref1 represents the first reference voltage, Vref2 represents the second reference voltage, and Vref3 represents the third reference voltage.

Preferably, the self-powered power supply drive circuit further includes a power supply direct-charging circuit, which is connected between the input terminal of the drive tube and the energy storage circuit, and is configured to directly take electrical power from the input power supply to charge the energy storage circuit until the power supply voltage is larger than a chip startup threshold, and to directly take electrical power from the input power supply to charge the energy storage circuit and guarantee that the power supply voltage is larger than the chip startup threshold when an operation of the drive tube cannot satisfy a self-powered demand.

Preferably, the drive tube is a Darlington transistor, which includes a primary transistor and a secondary transistor, wherein the discharging circuit includes a first discharging switch and a second discharging switch; wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

Preferably, the current input circuit includes a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

Preferably, the control circuit includes a first PWM comparator, a second PWM comparator, a third PWM comparator and a logic circuit, wherein:

one input terminal of the third PWM comparator is connected with the third reference voltage, and the other input terminal of the third PWM comparator is connected with the output terminal of the sampling circuit, wherein the third PWM comparator is configured to output a third trigger signal when the sampled voltage increases to the third reference voltage;

one input terminal of the first PWM comparator is connected with the first reference voltage, and the other input terminal of the first PWM comparator is connected with the output terminal of the sampling circuit, wherein the first PWM comparator is configured to output a first trigger signal when the sampled voltage increases to the first reference voltage;

one input terminal of the second PWM comparator is connected with the second reference voltage, and the other input terminal of the second PWM comparator is connected with the output terminal of the sampling circuit, wherein the second PWM comparator is configured to output a second trigger signal when the sampled voltage increases to the second reference voltage;

the logic circuit is respectively connected with the first comparator, the second PWM comparator, the third PWM comparator, the charging detection circuit, the current sampling switch tube, the current input circuit and the discharging circuit.

Preferably, each time the logic circuit enters the switching-on cycle, if the logic circuit fails to receive the self-charging signal, the logic circuit is configured to firstly switch on the current sampling switch tube and switch off the charging switch tube after entering the switching-on cycle, to switch off the current input circuit when receiving the first trigger signal, and to switch off the current sampling switch tube and synchronously control the discharging circuit to discharge when receiving the second trigger signal;

each time the logic circuit enters the switching-on cycle, if the logic circuit receives the self-charging signal, the logic circuit is configured to firstly switch on the current sampling switch tube and switch off the charging switch tube after entering the switching-on cycle, to start a first timing when receiving the third trigger signal, to end the first timing to acquire the charging reference duration when receiving the first trigger signal, to start a second timing, and synchronously switch off the current input circuit and the current sampling switch tube and switch on the charging switch tube at a same time when ending the first timing, and to switch off the charging switch tube and synchronously control the discharging circuit to discharge when the second timing reaches the charging execution duration.

Preferably, the sampling circuit further includes a controlled terminal which is connected with a controlled terminal of the current sampling switch tube, wherein both controlled terminals are connected with the control circuit, such that the control circuit is configured to synchronously control the sampling circuit to sample when controlling the current sampling switch tube to be switched on, and to synchronously control the sampling circuit to stop sampling when controlling the current sampling switch tube to be switched off.

Preferably, the sampling circuit includes an error amplifier, a sampling start switch, a first current mirror switch and a second current mirror switch which constitute a current mirror, a reference current switch, and a sampling resistor; wherein a first input terminal of the error amplifier is connected between the drive tube and the current sampling switch tube, and a second input terminal of the error amplifier is grounded through the sampling start switch, control terminals of the sampling start switch and the current sampling switch tube are connected with the control circuit, an output terminal of the error amplifier is connected with a control terminal of the reference current switch, an output terminal of the first current mirror switch is connected between the sampling start switch and the second input terminal of the error amplifier through the reference current switch, and an output terminal of the second current mirror switch is connected with a first terminal of the sampling resistor, wherein the first terminal of the sampling resistor is further connected with the control circuit, and a second terminal of the sampling resistor is grounded.

The self-powered power supply drive circuit and self-powered power supply drive chip in this disclosure have the following beneficial effects. The drive tube and the current sampling switch tube, which are connected in series, are connected between the input power supply and the ground. The current sampling switch tube is switched off and the charging switch tube is switched on during the pre-switching-off stage, such that the current which flows through the drive tube during the pre-switching-off stage is used to charge the energy storage circuit. The charging time is in the pre-switching-off stage, which never affects the normal switching cycle of the drive tube itself and the normal output of energy. Moreover, this way of charging during the pre-switching-off stage, does not require any additional auxiliary coil winding, so can realize a self-power supply, and solve the technical problems of process, power consumption and cost, which are caused by the above electrical power supply through the additional auxiliary coil winding in the prior art.

Further, under the above charging mode, when the drive tube is realized a Darlington transistor, compared with the transistor, its amplification factor is larger, the drive current required is smaller, and better conversion efficiency can be achieved. While compared with MOS tube, its relatively large Cbe capacitor can take advantage of its storage characteristics to have enough time to charge the energy storage circuit in the primary switching-on stage after the pre-switching-off, which never affects the normal switching cycle of the Darlington transistor itself and the normal output of energy. At the same time, its cost also has significant advantages and can achieve the same output power at a lower cost.

BRIEF DESCRIPTION OF THE DRAWINGS

In order to illustrate the embodiments of the present disclosure or the technical solutions in the prior art more clearly, the drawings needed in the description of the embodiments or the prior art will be briefly introduced. It is obvious that the drawings in the following description are only the embodiments of the present disclosure, and for one skilled in the art, other drawings can be obtained from the following attached drawings without paying creative labor.

DETAILED DESCRIPTION OF THE PREFERRED EMBODIMENT

Figure 1:
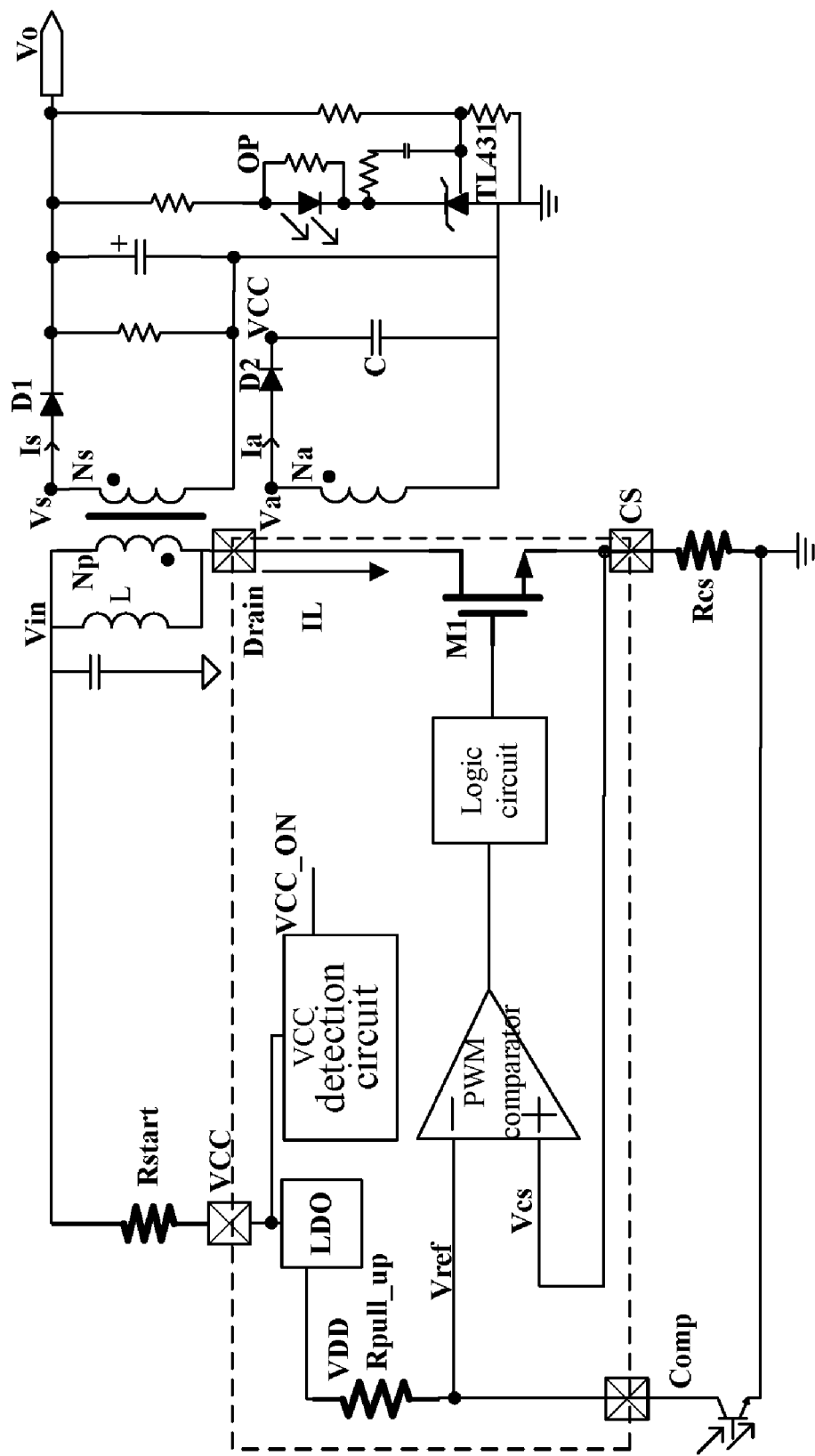
FIG. 1 is a block diagram of a traditional second side regulation (SSR) topology AC-DC circuit.

In order to facilitate the understanding of the present disclosure, a more comprehensive description of the present disclosure will be given as follows with reference to the relevant drawings. Typical embodiments of the present disclosure are shown in the drawings. However, the present disclosure can be implemented in many different forms and is not limited to the embodiments described herein. On the contrary, the purpose of providing these embodiments is to make the description of the present disclosure more thorough and comprehensive.

Unless otherwise defined, all technical and scientific terms used herein have the same meanings as those commonly understood by one skilled in the art of the present disclosure. The terms used in the description of the present disclosure are only for the purpose of describing specific embodiments, and are not intended to limit the present disclosure.

The terms "first", "second" and other ordinal numbers used in this specification can be used to describe but not limit the various constituent elements. The purpose of using these terms is to distinguish one constituent element from the other. For example, without departing from the scope of the present disclosure, the first constituent element can be named as the second constituent element, and similarly, the second constituent element can also be named as the first constituent element. The "connect with" or "connect to" mentioned herein not only includes the direct connection of two entities, but also includes the indirect connection through other entities with beneficial improvement effect. The terms "at the same time", "synchronous" or other similar terms are not limited to absolute equal or identical in mathematical terms. When implementing the embodiments described in this disclosure, they can be similar in engineering sense or within acceptable error range.

The present disclosure has provided a self-powered power supply drive circuit and a self-powered power supply drive chip without requiring any additional auxiliary coil winding, aiming at the technical problems of process, power consumption and cost, which are caused by the above electrical power supply through the additional auxiliary coil winding in the prior art. In this disclosure, the drive tube and the current sampling switch tube, which are connected in series, are connected between the input power supply and the ground. During normal operation, the control circuit can implement a feedback control on the drive tube based on the sampled voltage to enable the drive tube to be periodically in the switching-on cycle and the switching-off cycle. When the power supply of the energy storage circuit is insufficient, the charging detection circuit outputs a self-charging signal. After the control circuit receives a new self-charging signal from the charging detection circuit each time, it switches off the current sampling switch tube and switches on the charging switch tube in the later pre-switching-off stage of the switching-on cycle, and uses the current which flows through the drive tube during the pre-switching-off stage to charge the energy storage circuit. In this way, the self-powered power supply without any auxiliary coil winding is realized, and the original switch cycle and normal energy output are not affected.

In order to better understand the above technical scheme, the above technical scheme will be described in detail in combination with the drawings of the specification and the specific embodiments. It should be understood that the embodiment of the present disclosure and the specific features in the embodiment are the detailed description of the technical scheme of the present disclosure, not the limitation of the technical scheme of the present disclosure. In the case of no conflict, the embodiment of the present disclosure and the technical features in the embodiment can be combined with each other.

Figure 2:
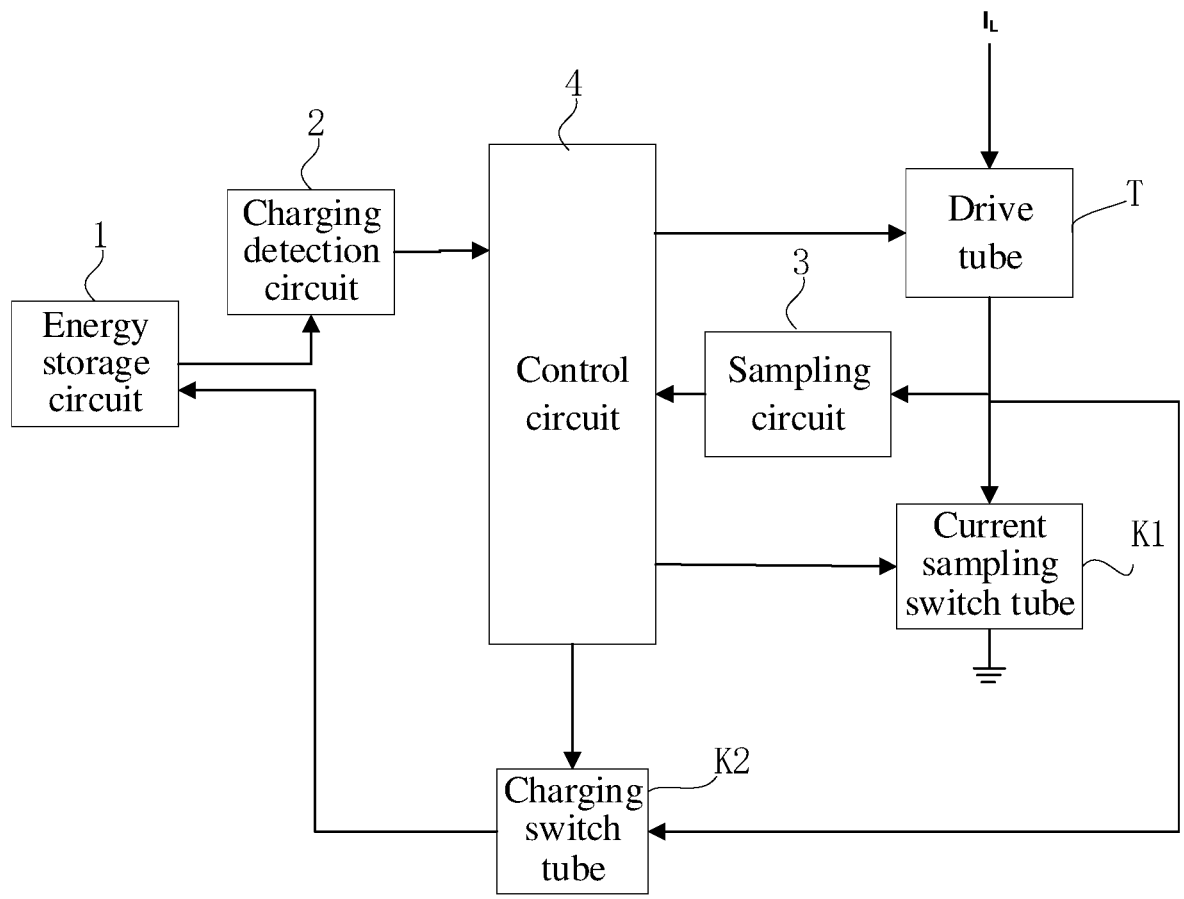
FIG. 2 is a block diagram of a self-powered power supply drive circuit according to an embodiment of the present disclosure.

The self-powered power supply drive circuit of this disclosure can be applied to AC-DC, DC-DC and other power supply chips. Referring to FIG. 2, the self-powered power supply drive circuit can be applied to control a drive tube to be switched on or off periodically to realize the power supply drive, and can also be applied to charge an energy storage circuit 1. The energy storage circuit 1 is configured to provide the power supply voltage VCC. For example, the energy storage circuit 1 is a capacitor C which is connected external to the chip. The self-powered power supply drive circuit of this disclosure c can be integrated into a self-powered power supply drive chip. The energy storage circuit 1 and the drive tube T are not recommended to be integrated into the self-powered power supply drive chip, but is generally externally connected to the self-powered power supply drive chip.

The self-powered power supply drive circuit of this disclosure includes a charging detection circuit 2, a current sampling switch tube K1, a charging switch tube K2, a sampling circuit 3 and a control circuit 4.

The charging detection circuit 2 is connected with the energy storage circuit 1, and is configured to detect a power supply voltage VCC of the energy storage circuit 1 and to generate a self-charging signal when the power supply voltage VCC is smaller than a self-charging threshold Vth2. The implementation method of the charging detection circuit 2 is not limited. For example, it can be composed of a conventional voltage sampling circuit and a voltage comparison circuit. The voltage sampling circuit is not limited to a voltage division sampling circuit. The reference value of the voltage comparison circuit is set as a value that needs to be compared, such as Vth2.

The drive tube T and the current sampling switch tube K1 are connected in series between an input power supply and ground. Specifically, an input terminal of the drive tube T is connected with an input power supply, and an output terminal of the drive tube T is grounded through the current sampling switch tube K1. The input power supply which is connected with the drive tube T is mainly AC power supply. Referring FIG. 4, For example, one primary terminal of a transformer in an AC-DC power supply system can be directly connected to an external input power supply, while the other primary terminal of the transformer can be connected to the input terminal of the drive tube T. Current which flows into the drive tube T is inductive current $I_L$. The drive tube T is switched periodically, and its operation cycle consists of a switching-on cycle and a switching-off cycle. The operation cycle and the peak value of the inductive current $I_L$ are determined according to the energy supply demand. For example, taking the application of FIG. 4 as an example, the operation cycle and the peak value of the inductive current $I_L$ of the drive tube T is affected by a load at the secondary winding.

An input terminal of the charging switch tube K2 is connected between the drive tube T and the current sampling switch tube K1, and an output terminal of the charging switch tube K2 is connected with the energy storage circuit 1.

An input terminal of the sampling circuit 3 is connected between the drive tube T and the current sampling switch tube K1 to acquire a current which flows from the drive tube T to the current sampling switch tube K1 for generating a sampled voltage Vcs.

The control circuit 4 is connected with an output terminal of the sampling circuit 3 to acquire the sampled voltage Vcs, and is connected with an output terminal of the charging detection circuit 2 and a control terminal of the charging switch tube K2. The control circuit 4 is configured to control the charging switch tube K2 to periodically and alternately enter a switching-on cycle and a switching-off cycle, based on the sampled voltage Vcs.

Wherein, each time the control circuit 4 enters the switching-on cycle, if the control circuit 4 fails to receive the self-charging signal, the control circuit 4 is configured to be in a first switching-on control state after entering the switching-on cycle, wherein the first switching-on control state represents switching on the current sampling switch tube K1 and switching off the charging switch tube K2;

Wherein, each time the control circuit 4 enters the switching-on cycle, if the control circuit 4 receives the self-charging signal, the control circuit 4 is configured to be in a first switching-on control state at an early stage after entering the switching-on cycle, and to be switched to a second switching-on control state in a later pre-switching-off stage to use a current which flows through the drive tube T during the pre-switching-off stage to charge the energy storage circuit 1; wherein the second switching-on control state represents switching off the current sampling switch tube K1 and switching on the charging switch tube K2.

On the one hand, in the normal operation state without charge, the charging switch tube K2 is switched off by a clock, and the control circuit 4 implements a feedback control on the drive tube T based on the sampled voltage Vcs to enable the drive tube T to be periodically in the switching-on cycle and the switching-off cycle. Specifically, when the power supply voltage VCC is normal and requires no charging, ending the switching-off cycle of the drive tube T and entering the switching-on cycle of the drive tube T are generally triggered by an oscillator of the chip, while ending the switching-on cycle of the drive tube T and entering the switching-off cycle of the drive tube T is realized by the feedback control of the control circuit 4 according to the sampled voltage Vcs.

On the other hand, in order to remove the auxiliary coil winding and realize the self-powered function without affecting the normal switch cycle of the drive tube T and the normal energy transfer of the current $I_L$, when a charging is required, one or more pre-switching-off stages of the switching-on cycle, is/are used to charge the energy storage circuit 1. Specifically, after the control circuit 4 receives a new self-charging signal, it switches off the current sampling switch tube K1 and switches on the charging switch tube K2 to use the current which flows through the drive tube T during the pre-switching-off stage to charge the energy storage circuit 1, in the pre-switching-off stage of the following switching-on cycle (one or more following switching-on cycles). Of course, during the self-powering, as that in the normal operation, ending the switching-off cycle of the drive tube T and entering the switching-on cycle of the drive tube T are generally triggered by an oscillator of the chip.

Figure 3:
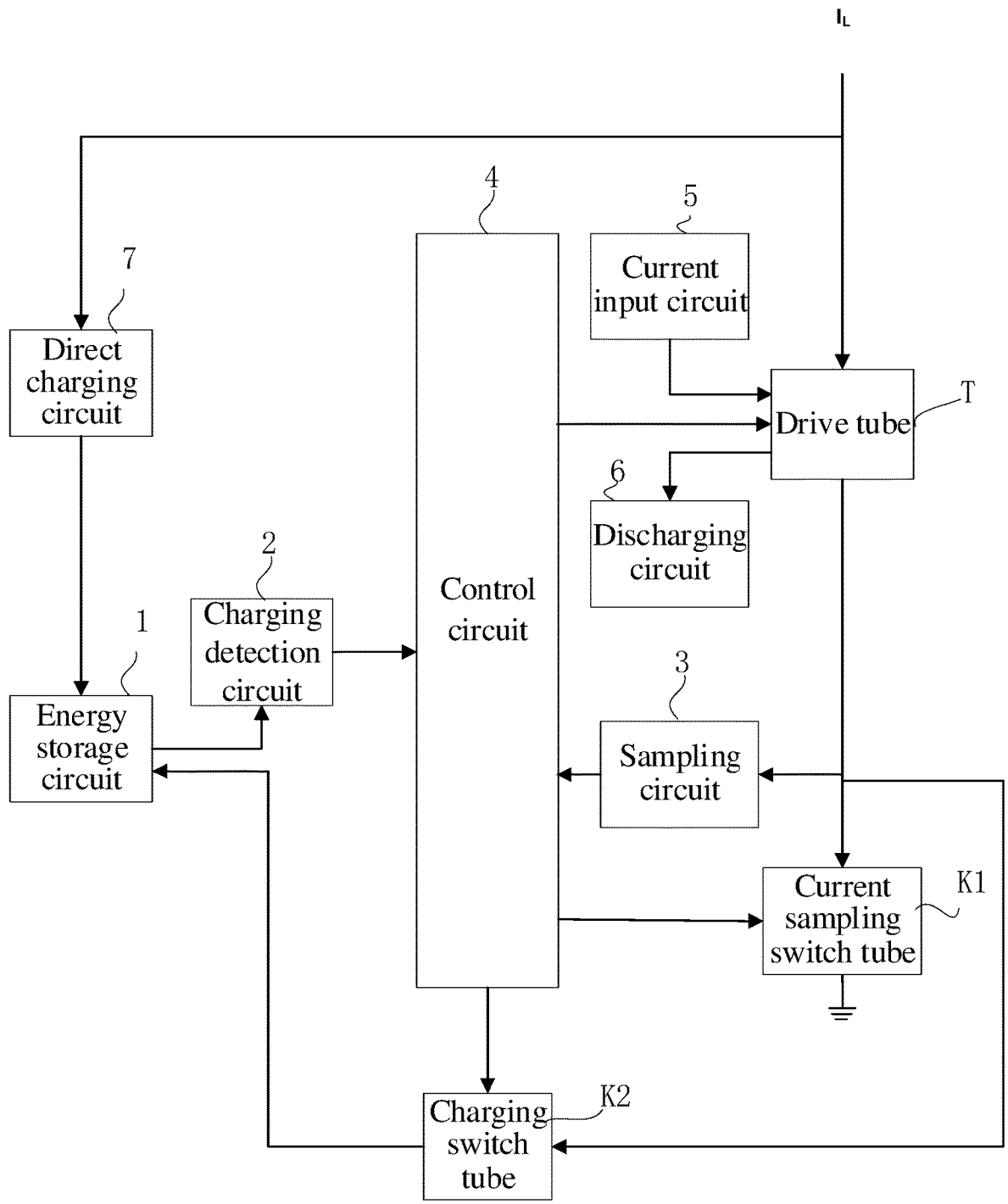
FIG. 3 is a block diagram of a self-powered power supply drive circuit according to a preferable embodiment of the present disclosure.

The pre-switching-off stage represents a period of the switching-on cycle which is from starting to drive the drive tube T to completely switch off the drive tube T. Specifically, the drive tube T needs a current input to drive its control terminal before it can be switched on. As shown in FIG. 3, a current input circuit 5 is connected to the control terminal of the drive tube T, and the current input circuit 5 is configured to input a current to drive the drive tube T to switch on. When we switch off the drive tube T, we first cut off the current input. For example, in each on cycle, when the sampled voltage Vcs reaches a first reference voltage Vref1, we cut off the current input circuit 5 to stop driving the drive tube T. However, even if the input current is cut off, the drive tube T is not completely switched off at this time, and the current $I_L$ which flows through the drive tube T continues increasing until the drive tube T is completely switched off. The period from the time when the control terminal of the drive tube T is cut off from the input current (i.e., from the time when stop driving the drive tube T) to the time when the drive tube T is completely switched off, is the pre-switching-off stage. In this disclosure, we use the pre-switching-off stage to charge.

However, after cutting off the input current at the control terminal of the drive tube T, we do not allow it to slowly reach the complete switching-off state. Because if so, the peak value of the current $I_L$, when the drive tube T is completely switched off, may not necessarily conform to our energy supply, and the peak value is uncontrollable. Referring to FIG. 3, preferably, in order to make the peak value of the current $I_L$ be controllable and satisfy the energy output requirements, we further designed a discharging circuit 6, which is connected with the control terminal of the drive tube T for discharging the control terminal of the drive tube T. Specifically, after stopping driving the drive tube T, when the sampled voltage Vcs continues increasing to a second reference voltage Vref2, we switch off the current sampling switch tube K1 and synchronously control the discharging circuit 6 to discharge, so that the drive tube T can be forcibly and completely switched off. It can be seen that the pre-switching-off stage is the period from stopping driving the drive tube T to completely switching off the drive tube T in the switching-on cycle. In fact, it is also the period during which the sampled voltage Vcs increases from the first reference voltage Vref1 to the second reference voltage Vref2.

Therefore, in general, the control circuit 4 is specifically configured to operate as follows.

On one hand, under the normal operation state without receiving the self-charging signal, in each switching-on cycle, the control circuit 4 switches off the current input circuit 5 to stop driving the drive tube T when the sampled voltage Vcs reaches the first reference voltage Vref1, and switches off the current sampling switch tube K1 and synchronously controls the discharging circuit 6 to discharge to forcibly and completely switch off the drive tube T when the sampled voltage Vcs continues to increase to the second reference voltage Vref2.

On the other hand, after each newly receiving a self-charging signal, the charging operation is performed in each subsequent switching-on cycle until the current self-charging signal is terminated.

The charging operation is specifically as follows. Specifically, the cutting-off of the input current at the control terminal of the drive tube T (i.e., stopping driving the drive tube T) during the switching-on cycle is the same as that in the normal operation state without charging. The difference is that when the charging operation is performed, the current sampling switch tube K1 is switched off while stopping driving the drive tube T. Meanwhile, at the same time when switching off the current sampling switch tube K1, the charging switch tube K2 is switched on synchronously. In this way, all the currents flowing through the drive tube T can reach the energy storage circuit 1 through the charging switch tube K2. In theory, we still need to guarantee the normal switch cycle of the drive tube T, and guarantee that the peak value of the current flowing through the drive tube T in each switching-on cycle satisfies the energy output demand. Therefore, we do not necessarily complete the charging at one time. In many cases, we use multiple switching-on cycles for multiple times of charging. However, when the charging switch tube K2 is switched on for charging, the current sampling switch tube K1 has been switched off synchronously, which means that the sampled voltage Vcs cannot be obtained through the sampling circuit 3. Therefore, the control circuit 4 cannot determine whether the drive tube T needs to be completely switched off by monitoring whether the sampled voltage Vcs reaches the second reference voltage Vref2. Based on this, in each switching-on cycle, before charging, we record the time, which is costed by the sampled voltage Vcs to increase from the third reference voltage Vref3 to the first reference voltage Vref1, in advance, as the charging reference duration of the current switching-on cycle, start timing and synchronously switch off the current input circuit 5, switch off the current sampling switch tube K1 and switch on the charging switch tube K2 when the sampled voltage Vcs reaches the first reference voltage Vref1. When the timing time reaches a charging execution duration, we switch off the charging switch tube K2 and synchronously control the discharging circuit 6 to discharge to forcibly and completely switch off the drive tube to enable the drive tube T to enter the next switching-off cycle. When the next switching-on cycle comes and the self-charging signal still maintains, the above charging operation is implemented again in the next switching-on cycle. Such operations are repeated until the self-charging signal disappears.

Preferably, the charging execution duration and the charging reference duration satisfy following equation:

$$(Vref2-Vref1)/tcharge=(Vref1-Vref3)/t1;$$

wherein t1 represents the charging reference duration, that is a time costed by the sampled voltage to increase from the third reference voltage Vref3 to the first reference voltage Vref1, tcharge represents the charging execution duration. When taking Vref2−Vref1=Vref1−Vref3, it means t1=tcharge. The above formula is valid because the change slope of the current flowing through the drive tube T in the same switching-on cycle is stable.

In addition, it should be noted that the "following switching-on cycle" mentioned above refers to N switching-on cycles starting from the next switching-on cycle. N is an integer, and N≥1. The specific amount of N is not fixed, as if the charging operation of these N switching-on cycles can remove the self-charging signal. For example, if the self-charging signal is generated during the $i_{th}$ operation cycle (no matter it is in the switching-on cycle or the switching-off cycle in the $i_{th}$ operation cycle), the self-charging signal is detected when entering the $i+1_{th}$ switching-on cycle, so the charging operation is implemented during the pre-switching-off cycle of the $i+1_{th}$ switching-on cycle. If the self-charging signal is still maintained at the end of the $i+1_{th}$ switching-on cycle, and then the self-charging signal is still maintained after one switching-off cycle and has not disappeared, then the self-charging signal is detected when entering the $i+2_{th}$ switching-on cycle, and the charging operation is implemented during the pre-switching-off cycle of the $i+2_{th}$ switching-on cycle. Then the self-charging signal is still maintained after one switching-off cycle and has not disappeared, and the charging operation is implemented during the pre-switching-off cycle of the $i+3_{th}$ switching-on cycle, and so on, until the self-charging signal disappears. After the charging signal disappears, the drive tube T returns to the normal operation state.

The switching-on and switching-off time of each switch and circuit in one integral operation cycle is summarized as follows.

1) When the oscillator triggers the logic circuit of the control circuit 4, the current input circuit 5 and the current sampling switch tube K1 are switched on, and the discharge circuit 6 is switched off. At this time, a switching-on cycle begins.

If there is no self-charging signal when entering the current switching-on cycle, the current input circuit 5 is switched off when the sampled voltage Vcs reaches the first reference voltage Vref1. When the sampled voltage Vcs continues increasing to the second reference voltage Vref2, the current sampling switch tube K1 is switched off and the discharge circuit 6 is synchronously switched on to start discharging. At this time, the switching-on cycle ends.

If there is a self-charging signal when entering the current switching-on cycle, the first timing starts when the sampled voltage Vcs reaches the third reference voltage Vref3. When the sampled voltage Vcs reaches the first reference voltage Vref1, the first timing stops to obtain the charging reference duration t1, and simultaneously a second timing starts. When stopping the first timing, the current input circuit 5 and the current sampling switch tube K1 are switched off while the charging switch tube K2 is switched on. When the second timing reaches the charging execution duration tcharge, the charging switch tube K2 is switched off and synchronously the discharge circuit 6 is switched on for discharging. At this time, the switching-on cycle ends.

2) After the switching-on cycle ends, the switching-off cycle starts, in which wait for the next oscillator trigger to enter the switching-on cycle again.

Preferably, the self-powered power supply drive circuit further includes a power supply direct-charging circuit 7, which is connected between the input terminal of the drive tube T and the energy storage circuit 1, and is configured to directly take electrical power from the input power supply to charge the energy storage circuit 1 until the power supply voltage VCC is larger than a chip startup threshold Vth1, and to directly take electrical power from the input power supply to charge the energy storage circuit 1 and guarantee that the power supply voltage VCC is larger than the chip startup threshold Vth1 when an operation of the drive tube T cannot satisfy a self-powered demand (which means the drive tube T does not stop operating, but its operation cycle cannot satisfy the self-powering demand). The power supply direct-charging circuit 7 can be a controllable switch. When charging is required, the controllable switch is switched on, and the controllable switch is controlled by the power on enabling signal (POR signal) and the charging detection circuit 2.

The charging detection circuit 2 is also configured to trigger the power supply direct charging circuit 7 to stop charging the energy storage circuit 1 when it detects that the power supply direct charging circuit 7 charges the energy storage circuit 1 when it is powered on until the power supply voltage VCC is greater than the chip startup threshold Vth1, and to output a chip startup signal vcc_on to trigger the chip to start normal operation. The chip startup threshold Vth1 is greater than the self-charging threshold Vth2.

The charge detection circuit 2 is also configured to output a chip shutoff signal vcc_off to trigger the chip to reset and stop operating, when detecting that the energy storage circuit 1 discharges to a chip reset threshold Vth3 after the drive tube T stops operating.

Take a scenario as an example. Assuming that the self-powered power supply drive circuit of this disclosure is used on a PD charger, when the PD charger is just inserted into a socket, that is, when it starts to be powered on, the power supply direct charging circuit 7 firstly charges the energy storage circuit. After the power supply voltage VCC reaches the chip startup threshold Vth1, the power supply direct charging circuit 7 is no longer used to charge. After sending the chip startup signal vcc_on to reset the circuit, we realize the self-charging based on the preset self-charging threshold Vth2. When we unplug the PD charger from the socket, the drive tube T stops operating, and the self-charging never occurs. Then the energy storage circuit 1 discharges. When the discharged voltage reaches the chip reset threshold Vth3, the chip shutoff signal vcc_off is outputted to trigger the chip to reset and stop operating. In addition, after inserted into the socket, when the load is light, the whole system operates in the cycle skipping mode. The current $I_L$ is relatively small and the operation cycle is relatively small. Therefore, the self-powering mode using the drive tube T is not enough to provide the operating current of the chip. The power direct charging circuit 7 is restarted to charge the energy storage circuit 1 to guarantee that the chip shutoff signal vcc_off is not reset and the whole chip can operate normally.

Figure 4:
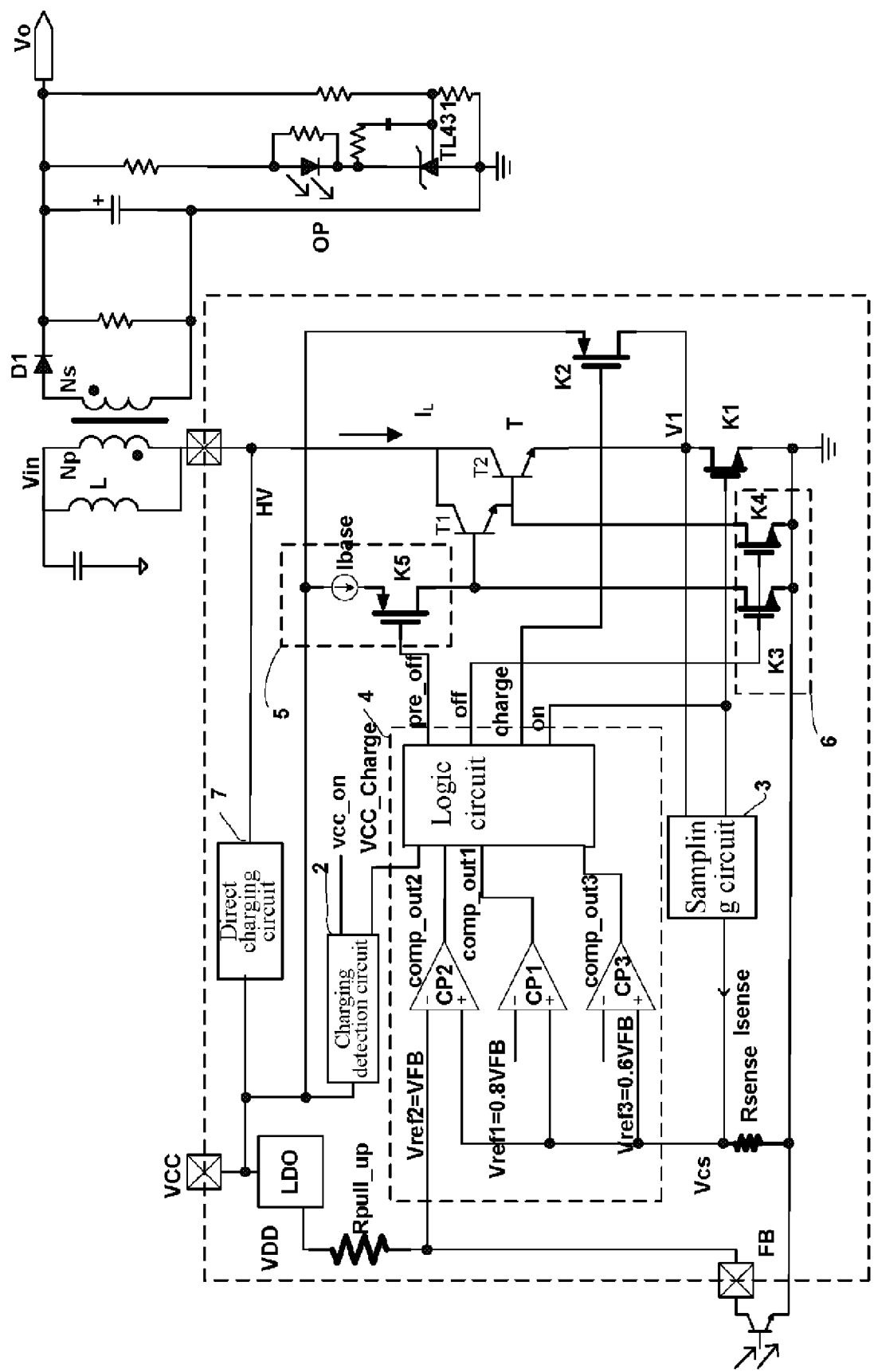
FIG. 4 is a schematic diagram of an application scenario of an SSR topology AC-DC power supply chip according to a preferable embodiment of the present disclosure.

Referring to FIG. 4, a specific circuit example is given below by taking SSR topology AC-DC power supply chip integrated with self-powered power supply drive chip according to an embodiment of the present disclosure as an example. The AC-DC power supply chip includes a self-powered power supply drive chip and a drive tube T, and the AC-DC power supply chip is externally connected with an energy storage circuit 1. The AC-DC power chip includes a power supply input pin, a chip voltage pin VCC and a feedback pin FB. The input terminal of the drive tube T is connected with the power supply input pin. The energy storage circuit 1 is connected with the chip voltage pin VCC. The feedback pin FB is connected to a photocouple OP of the secondary coil winding to obtain the second reference voltage Vref2, so that the control circuit 4 can know the output voltage Vout according to the second reference voltage Vref2, so as to determine how much energy to give.

Preferably, the drive tube T is a Darlington transistor, which includes a primary transistor T1 and a secondary transistor T2, the discharging circuit 6 includes a first discharging switch K3 and a second discharging switch K4; wherein the first discharging switch K3 is connected between a base of the primary transistor T1 and ground, the second discharging switch K4 is connected between a base of the secondary transistor T2 and ground, wherein the discharging circuit 6 discharges when the first discharging switch K3 and the second discharging switch K4 are switched on simultaneously. Specifically, the first discharging switch K3 and second discharging switch K4 are NMOS tubes NM3 and NM2 in this embodiment.

Preferably, the current input circuit 5 includes a current source Ibase and a current input switch K5, wherein the current source Ibase takes electrical power from the power supply voltage VCC to generate a current, the current input switch K5 is connected between the base of the primary transistor T1 and the current source Ibase, wherein when the current input switch K5 is switched on, the drive tube T is switched on by the drive current inputted by the current input circuit 5. Specifically, the current input switch K5 is PMOS tube PM1 in this embodiment.

Specifically, the control circuit 4 includes a first Pulse-Width Modulation (PWM) comparator CP1, a second PWM comparator CP2, a third PWM comparator CP3 and a logic circuit.

One input terminal of the third PWM comparator CP3 is connected with the third reference voltage Vref3, and the other input terminal of the third PWM comparator CP3 is connected with the output terminal of the sampling circuit 3, wherein the third PWM comparator CP3 is configured to output a third trigger signal comp_out3 when the sampled voltage Vcs increases to the third reference voltage Vref3.

One input terminal of the first PWM comparator CP1 is connected with the first reference voltage Vref, and the other input terminal of the first PWM comparator CP1 is connected with the output terminal of the sampling circuit 3, wherein the first PWM comparator CP1 is configured to output a first trigger signal comp_out1 when the sampled voltage Vcs increases to the first reference voltage Vref;

One input terminal of the second PWM comparator CP2 is connected with the second reference voltage Vref2, and the other input terminal of the second PWM comparator CP2 is connected with the output terminal of the sampling circuit 3, wherein the second PWM comparator CP2 is configured to output a second trigger signal comp_out2 when the sampled voltage Vcs increases to the second reference voltage Vref2.

The logic circuit is respectively connected with the first comparator, the second PWM comparator CP2, the third PWM comparator CP3, the charging detection circuit 2, the current sampling switch tube K1, the current input circuit 5 and the discharging circuit 6.

Each time the logic circuit enters the switching-on cycle, if the logic circuit fails to receive the self-charging signal, the logic circuit is configured to firstly switch off the current input circuit 5 when receiving the first trigger signal comp_out1, switch off the current sampling switch tube K1 and synchronously control the discharging circuit 6 to discharge when receiving the second trigger signal comp_out2.

Each time the logic circuit enters the switching-on cycle, if the logic circuit receives the self-charging signal, the logic circuit is configured to firstly switch on the current sampling switch tube K1 and switch off the charging switch tube K2 after entering the switching-on cycle, to start a first timing when receiving the third trigger signal comp_out3, to end the first timing to acquire the charging reference duration t1 when receiving the first trigger signal comp_out1, to start a second timing, synchronously switch off the current input circuit 5 and switch off the current sampling switch tube K1 and switch on the charging switch tube K2 at a same time when ending the first timing, and to switch off the charging switch tube K2 and synchronously control the discharging circuit 6 to discharge when the second timing reaches the charging execution duration tcharge.

In an embodiment of this disclosure, the logic circuit can be implemented using logic gates which may include corresponding And gates, Or gates, latches and the likes.

Preferably, the sampling circuit 3 further includes a controlled terminal which is connected with a controlled terminal of the current sampling switch tube K1, wherein both controlled terminals are connected with the control circuit 4, such that the control circuit 4 is configured to synchronously control the sampling circuit 3 to sample when controlling the current sampling switch tube K1 to be switched on, and to synchronously control the sampling circuit 3 to stop sampling when controlling the current sampling switch tube K1 to be switched off.

Figure 5:
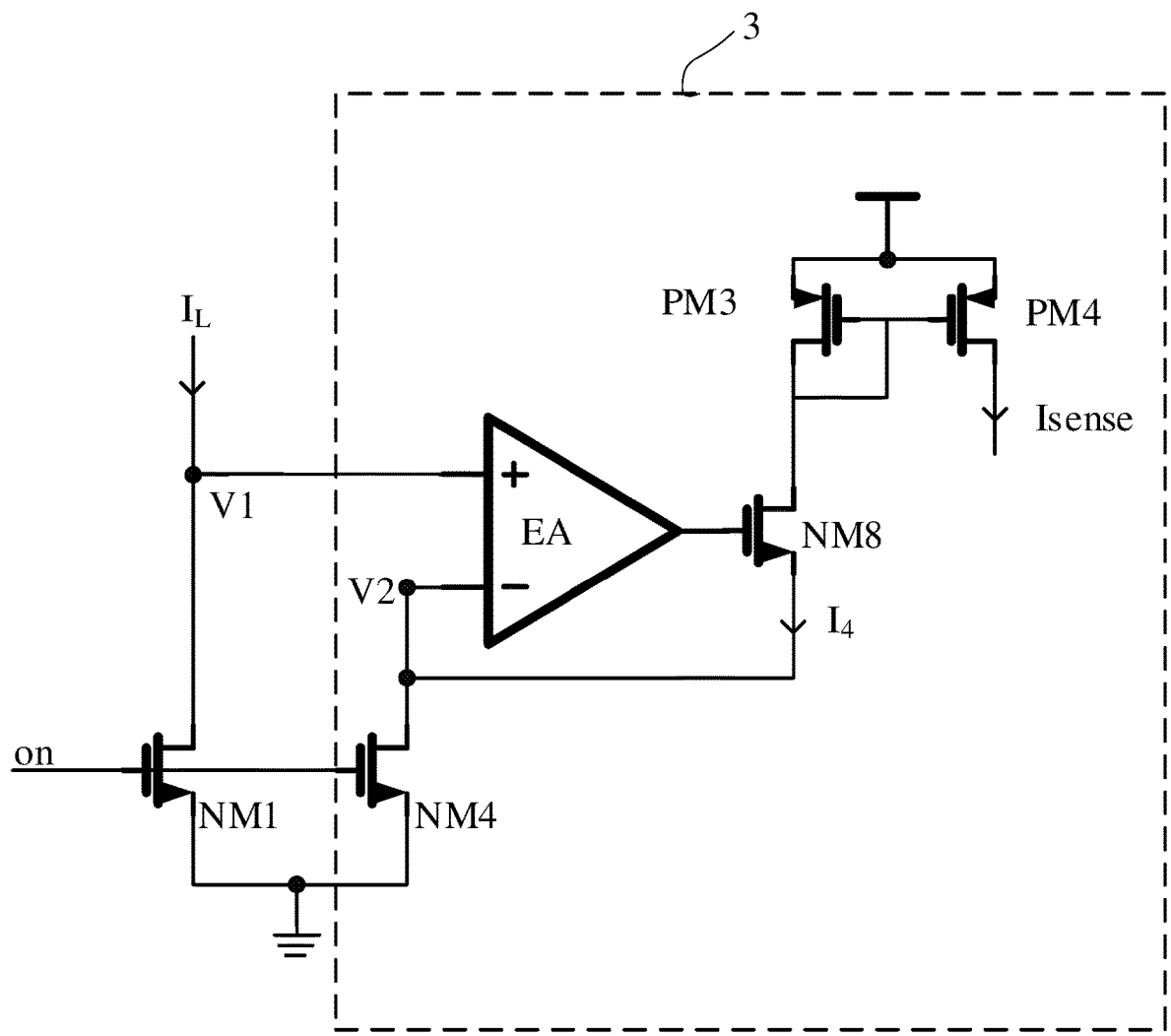
FIG. 5 is a schematic diagram of a specific embodiment of a sampling circuit shown in FIG. 4.

Preferably, referring FIG. 5, the sampling circuit 3 includes an error amplifier EA, a sampling start switch K6, a first current mirror switch K7 and a second current mirror switch K8 which constitute a current mirror, a reference current switch K9. The sampling start switch K6 and the reference current switch K9 are NMOS tubes, while the first current mirror switch K7 and second current mirror switch K8 are PMOS tubes. Referring FIG. 5, the sampling start switch K6 especially refers to NMOS tube NM4, the reference current switch K9 especially refers to NMOS tube NM8, the first current mirror switch K7 especially refers to PMOS tubes PM3, the second current mirror switch K8 refers to PMOS tubes PM4, and the current sampling switch tube K1 especially refers to NMOS tube NM1.

A first input terminal of the error amplifier EA is connected between the drive tube T and the current sampling switch tube K1, and a second input terminal of the error amplifier EA is grounded through the sampling start switch K6, control terminals of the sampling start switch K6 and the current sampling switch tube K1 are connected together with the control circuit 4, an output terminal of the error amplifier EA is connected with a control terminal of the reference current switch K9, an output terminal of the first current mirror switch K7 is connected between the sampling start switch K6 and the second input terminal of the error amplifier EA through the reference current switch K9, and an output terminal of the second current mirror switch K8 is connected with a first terminal of the sampling resistor Rsense. The first terminal of the sampling resistor Rsense is further connected with the input terminals of the first comparator, the second PWM comparator CP2, the third PWM comparator CP3 of the control circuit. A second terminal of the sampling resistor Rsense is grounded.

In this embodiment, the current sampling switch tube K1 is used to replace the resistor Rcs in FIG. 1 and is integrated in the chip. Considering the internal heating problem of the chip, its impedance is much smaller than the resistor Rcs in FIG. 1. The value of VFB (which refers to Vref in FIG. 1) is relatively large, so the sampled inductance current $I_L$ is mirrored by the sampling circuit and converted into voltage Vcs, which is inputted into three PWM comparators. The current sampling switch tube K1 is proportional to the sampling start switch K6 in size, and the proportional coefficient is K. According to the virtual short circuit and virtual disconnection characteristics of the error amplifier EA, V1=V2, then $I_L$*Rds1=I4*Rds4, Rds4=KRds1, and we can obtain I4=$I_L$/K, Isense=I4=$I_L$/K, Vcs=$I_L$/K*Rsense. Wherein V1 refers to the voltage at the first input terminal of the error amplifier EA, and V2 refers to the voltage at the second input terminal of the error amplifier EA, ISense refers to a multiple of the sampled inductance current, Rds1 refers to a resistance value of NOMS tube NM1 (that is, the current sampling switch tube K1); I4 refers to a current flowing through NOMS tube NM4, Rds4 refers to a resistance value of NOMS tube NM4 (that is, the sampling start switch K6). Based on this, it can be seen that selecting the appropriate proportional parameter K and resistance Rcs in can guarantee the normal operation of the system.

Figure 6:
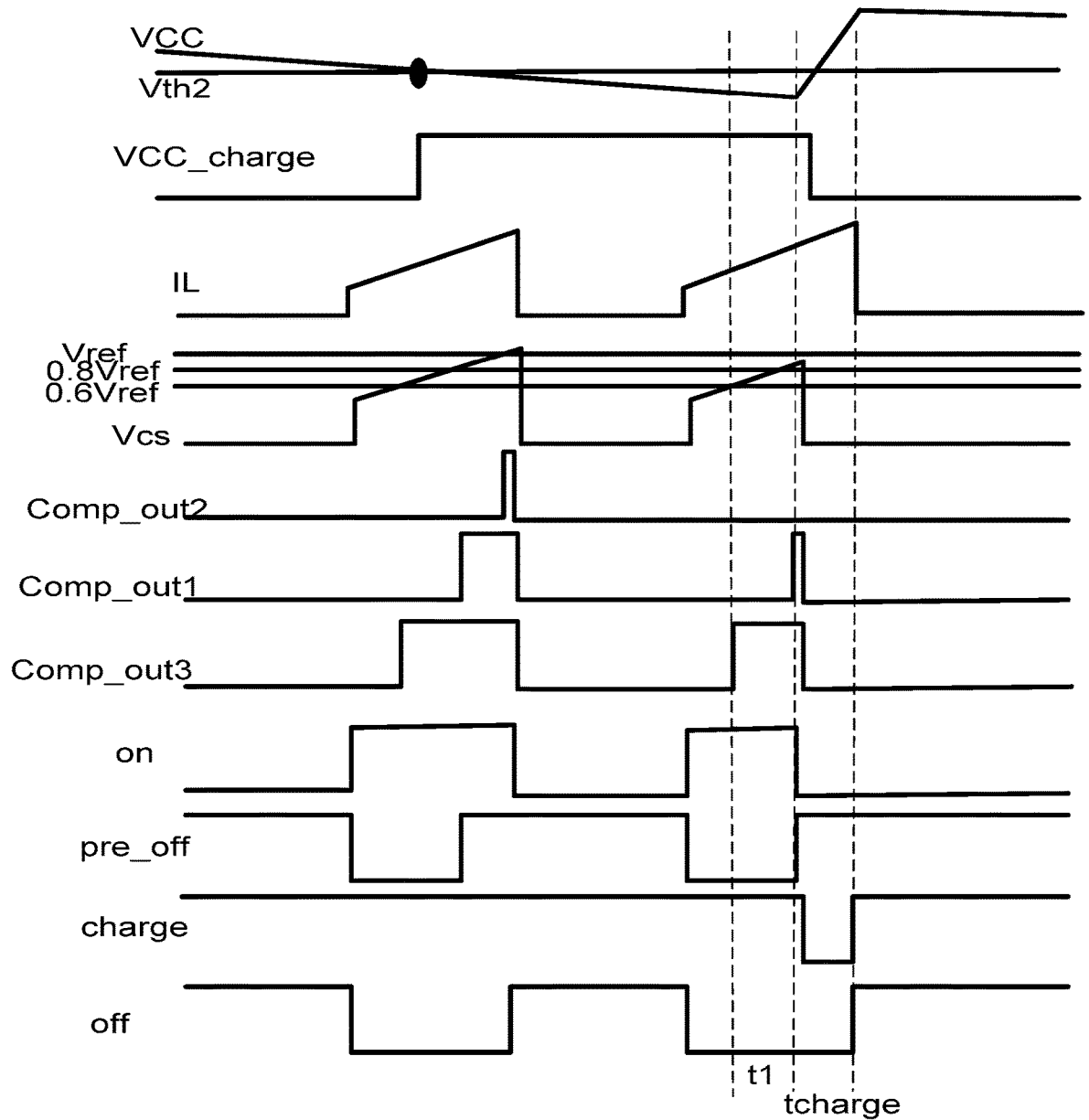
FIG. 6 is an operation waveform diagram of the circuit shown in FIG. 4.

The following describes the complete operation principle of this disclosure with a specific example (assuming Vref2=VFB, Vref1=0.8 VFB, Vref3=0.6 VFB, then t1=t2) in combination with FIGS. 5 and 6.

1) When the chip is powered on, the capacitor C is charged through the power supply direct charging circuit. When the charging detection circuit 2 detects that the voltage VCC reaches the first reference voltage Vref1, it triggers a chip startup signal vcc_on sand the chip starts operating normally, at the same time, the power supply direct charging circuit is stopped to supply power to the capacitor C, and the chip starts self-powering the capacitor C through the operation of its own drive tube T.

2) During normal operation, when Vcs=0.8VFB, the PWM comparator CS1 outputs a first trigger signal comp_out1 which is a high level to switch off the PMOS tube PM1 (that is, the current input switch K5). At this time, the electrical charge stored in the capacitor Cbe of the drive tube T can still guarantee its normal operation. When Vcs=VFB, the PWM comparator CS2 outputs a second trigger signal comp_out2 to switch off the NMOS tube NM1 (that is, the current sampling switch tube K1), switch on the NMOS tubes NM2 and NM3 (that is, the first discharging switch K3 and second discharging switch K4). Such that, the drive tube T is completely switched off, and the secondary side starts discharging until the drive tube T is switched on next time. An operation cycle is completed.

3) When detecting that the voltage VCC is smaller than Vth2, the VCC_charge signal is triggered to turn over. That is, a self-charging signal is outputted. At this time, the logic circuit determines that the capacitor C needs to be charged. Therefore, starting from the next switching-on cycle of Darlington T, the inductance current $I_L$ is used to charge the capacitor C. The charging process in one switching-on cycle is as follows. When the sampled voltage Vcs increases to 0.8VFB and the first trigger signal comp_out1 switches to be a high level, the NMOS tube NM1 and PMOS tube PM1 are switched off, PMOS tube PM2 (that is, the charging switch tube K2) is switched on. As the inductance current $I_L$ cannot change abruptly. At this time, the voltage of V1 becomes VCC+RPM2*$I_L$, wherein RPM2 represents the resistance of the PMOS tube PM2. Due to the existence of its own capacitance Cbe, the base voltage of the primary transistor T1 and secondary transistor T2 increase to V1+Vbe2 and V1+Vbe2+Vbe1, respectively. The drive tube T is still in the normal switching-on state, and the inductance current $I_L$ charges the capacitor C through the PMOS tube PM2. When charging the capacitor C, because NMOS tube NM1 is switched off, the sampling circuit 3 cannot sample the inductance current $I_L$, that is, the sampled voltage Vcs becomes 0 at this time, and cannot reach the required final value VFB at all. Therefore, a reference quantity is required to determine the final value of the inductance current $I_L$. Therefore, the comparator CP3 is introduced to compare the sampled voltage Vcs with 0.6VFB. The logic circuit 4 times the time t1 which is costed for the sampled voltage Vcs to increase from 0.6VFB to 0.8VFB. Time t1 is the charging reference duration. Take time t1 as the charging execution duration tcharge for charging the capacitor C in the current switching-on cycle, that is, time again from the sampled voltage Vcs reaches 0.8VFB, and switch off the PMOS tube PM2 again, switches on the NMOS tubes NM2 and NM3. The drive tube T is completely switched off, and the secondary side starts discharging until the drive tube T is switched on for the next time. And an operation cycle is completed.

4) When operating under light load, the whole system operates in the cycle skipping mode. The current $I_L$ is relatively small and the operation cycle is relatively small. Therefore, the self-powering mode using the drive tube T is not enough to provide the operating current of the chip. The power direct charging circuit 7 is restarted to charge the energy storage circuit 1 to guarantee that the chip shutoff signal vcc_off is not reset and the whole chip can operate normally.

5) When Darlington stops the switch action and the capacitor continues to discharge to the third reference voltage Vth3, and the chip shutoff signal vcc_off signal is reset.

To sum up, the self-powered power supply drive circuit and self-powered power supply drive chip in this disclosure have the following beneficial effects.

The current which flows through the drive tube during the pre-switching-off stage is used to charge the energy storage circuit. That is, this way of charging during the pre-switching-off stage, does not require any additional auxiliary coil winding, so can realize a self-power supply, and solve the technical problems of process, power consumption and cost, which are caused by the above electrical power supply through the additional auxiliary coil winding in the prior art. Meanwhile the charging time is in the pre-switching-off stage in the following switching-on cycle after newly receiving the self-charging signal, which never affects the normal switching cycle of the drive tube itself and the normal output of energy.

Further, under the above charging mode, when the drive tube is realized a Darlington transistor, compared with the transistor, its amplification factor is larger, the drive current required is smaller, and better conversion efficiency can be achieved, while compared with MOS tube, its relatively large Cbe capacitor can take advantage of its storage characteristics to have enough time to charge the energy storage circuit in the primary switching-on stage after the pre-switching-off, which never affects the normal switching cycle of the Darlington transistor itself and the normal output of energy. At the same time, its cost also has significant advantages and can achieve the same output power at a lower cost.

In this disclosure, not an externally connected resistor, but the current sampling switch tube is used to sample the current flowing through the Darlington transistor, so the current sampling switch tube can be integrated in the chip, saving the peripheral components. At the same time, when charging is required, it can be completely switched off, so that all the currents flowing through the Darlington transistor can charge the energy storage circuit through the charging switch tube.

The embodiments of the present disclosure are described above in combination with the drawings, but the present disclosure is not limited to the above specific embodiments. The above specific embodiments are only schematic, not restrictive. Ordinary technicians in the art can make many forms under the enlightenment of the present disclosure and without departing from the scope of the purpose and claims of the present disclosure, and these are within the protection of the present disclosure.

The invention claimed is:
1. A self-powered power supply drive circuit comprising:
a charging detection circuit, which is connected with an energy storage circuit, and is configured to detect a power supply voltage of the energy storage circuit and to generate a self-charging signal when the power supply voltage is smaller than a self-charging threshold;
a current sampling switch tube, which is connected with an output terminal of a drive tube, wherein an input terminal of the drive tube is connected with an input power supply and the output terminal of the drive tube is grounded through the current sampling switch tube;
a charging switch tube, wherein an input terminal of the charging switch tube is connected between the drive tube and the current sampling switch tube, and an output terminal of the charging switch tube is connected with the energy storage circuit;
a sampling circuit, wherein an input terminal of the sampling circuit is connected between the drive tube and the current sampling switch tube to acquire a current which flows from the drive tube to the current sampling switch tube for generating a sampled voltage; and
a control circuit, which is connected with an output terminal of the sampling circuit to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;

wherein, each time the control circuit enters the switching-on cycle, if the control circuit fails to receive the self-charging signal, the control circuit is configured to be in a first switching-on control state after entering the switching-on cycle, wherein the first switching-on control state represents switching on the current sampling switch tube and switching off the charging switch tube;

wherein, each time the control circuit enters the switching-on cycle, if the control circuit receives the self-charging signal, the control circuit is configured to be in a first switching-on control state at an early stage after entering the switching-on cycle, and to be switched to a second switching-on control state in a later pre-switching-off stage to use a current which flows through the drive tube during the pre-switching-off stage to charge the energy storage circuit; wherein the pre-switching-off stage represents a period of the switching-on cycle which is from starting driving the drive tube to completely switching off the drive tube; the second switching-on control state represents switching off the current sampling switch tube and switching on the charging switch tube.

2. The self-powered power supply drive circuit according to claim 1, wherein further comprising:
a current input circuit, which is connected with a control terminal of the drive tube and is configured to input a drive current to switch on the drive tube; and
a discharging circuit, which is connected with the control terminal of the drive tube and is configured to discharge the control terminal of the drive tube;
wherein, each time the control circuit enters the switching-on cycle, if the control circuit fails to receive the self-charging signal, the control circuit is specifically configured to be in the first switching-on control state after entering the switching-on cycle, to switch off the current input circuit to stop driving the drive tube when the sampled voltage reaches a first reference voltage, and to switch off the current sampling switch tube and synchronously control the discharging circuit to discharge to forcibly and completely switch off the drive tube to enable the drive tube to enter the switching-off cycle when the sampled voltage continues to increase to a second reference voltage;
wherein, each time the control circuit enters the switching-on cycle, if the control circuit receives the self-charging signal, the control circuit is specifically configured to be in the first switching-on control state at an early stage after entering the switching-on cycle, and to record a time, which is costed by the sampled voltage to increase from a third reference voltage to the first reference voltage, as a charging reference duration of a current switching-on cycle, and to acquire a charging execution duration based on the charging reference duration, to switch off the current input circuit to stop driving the drive tube when the sampled voltage reaches the first reference voltage, and to switch to the second switching-on control state and start timing at a same time when stop driving the drive tube, and to switch off the charging switch tube and synchronously control the discharging circuit to discharge to forcibly and completely switch off the drive tube to enable the drive tube to enter the switching-off cycle when the timed time reaches the charging execution duration.

3. The self-powered power supply drive circuit according to claim 2, wherein the charging execution duration and the charging reference duration satisfy following equation:

$$(Vref2-Vref1)/tcharge=(Vref1-Vref3)/t1;$$

wherein t1 represents the charging reference duration, tcharge represents the charging execution duration, Vref1 represents the first reference voltage, Vref2 represents the second reference voltage, and Vref3 represents the third reference voltage.

4. The self-powered power supply drive circuit according to claim 1, wherein further comprising a power supply direct-charging circuit, which is connected between the input terminal of the drive tube and the energy storage circuit, and is configured to directly take electrical power from the input power supply to charge the energy storage circuit until the power supply voltage is larger than a chip startup threshold, and to directly take electrical power from the input power supply to charge the energy storage circuit and guarantee that the power supply voltage is larger than the chip startup threshold when an operation of the drive tube cannot satisfy a self-powered demand.

5. The self-powered power supply drive circuit according to claim 2, wherein the drive tube is a Darlington transistor, which comprises a primary transistor and a secondary transistor, wherein the discharging circuit comprises a first discharging switch and a second discharging switch; wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

6. The self-powered power supply drive circuit according to claim 5, wherein the current input circuit comprises a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

7. The self-powered power supply drive circuit according to claim 5, wherein the control circuit comprises a first PWM comparator, a second PWM comparator, a third PWM comparator and a logic circuit, wherein:
one input terminal of the third PWM comparator is connected with the third reference voltage, and the other input terminal of the third PWM comparator is connected with the output terminal of the sampling circuit, wherein the third PWM comparator is configured to output a third trigger signal when the sampled voltage increases to the third reference voltage;
one input terminal of the first PWM comparator is connected with the first reference voltage, and the other input terminal of the first PWM comparator is connected with the output terminal of the sampling circuit, wherein the first PWM comparator is configured to output a first trigger signal when the sampled voltage increases to the first reference voltage;
one input terminal of the second PWM comparator is connected with the second reference voltage, and the other input terminal of the second PWM comparator is connected with the output terminal of the sampling circuit, wherein the second PWM comparator is configured to output a second trigger signal when the sampled voltage increases to the second reference voltage;
the logic circuit is respectively connected with the first comparator, the second PWM comparator, the third PWM comparator, the charging detection circuit, the current sampling switch tube, the current input circuit and the discharging circuit.

8. The self-powered power supply drive circuit according to claim 7, wherein:
each time the logic circuit enters the switching-on cycle, if the logic circuit fails to receive the self-charging signal, the logic circuit is configured to firstly switch on the current sampling switch tube and switch off the charging switch tube after entering the switching-on cycle, to switch off the current input circuit when receiving the first trigger signal, and to switch off the current sampling switch tube and synchronously control the discharging circuit to discharge when receiving the second trigger signal;
each time the logic circuit enters the switching-on cycle, if the logic circuit receives the self-charging signal, the logic circuit is configured to firstly switch on the current sampling switch tube and switch off the charging switch tube after entering the switching-on cycle, to start a first timing when receiving the third trigger signal, to end the first timing to acquire the charging reference duration when receiving the first trigger signal, to start a second timing, and synchronously switch off the current input circuit and the current sampling switch tube and switch on the charging switch tube at a same time when ending the first timing, and to switch off the charging switch tube and synchronously control the discharging circuit to discharge when the second timing reaches the charging execution duration.

9. The self-powered power supply drive circuit according to claim 2, wherein the sampling circuit further comprises a controlled terminal which is connected with a controlled terminal of the current sampling switch tube, wherein both controlled terminals are connected with the control circuit, such that the control circuit is configured to synchronously control the sampling circuit to sample when controlling the current sampling switch tube to be switched on, and to synchronously control the sampling circuit to stop sampling when controlling the current sampling switch tube to be switched off.

10. The self-powered power supply drive circuit according to claim 2, wherein the sampling circuit comprises an error amplifier, a sampling start switch, a first current mirror switch and a second current mirror switch which constitute a current mirror, a reference current switch, and a sampling resistor; wherein a first input terminal of the error amplifier is connected between the drive tube and the current sampling switch tube, and a second input terminal of the error amplifier is grounded through the sampling start switch, control terminals of the sampling start switch and the current sampling switch tube are connected with the control circuit, an output terminal of the error amplifier is connected with a control terminal of the reference current switch, an output terminal of the first current mirror switch is connected between the sampling start switch and the second input terminal of the error amplifier through the reference current switch, and an output terminal of the second current mirror switch is connected with a first terminal of the sampling resistor, wherein the first terminal of the sampling resistor is further connected with the control circuit, and a second terminal of the sampling resistor is grounded.

11. A self-powered power supply drive chip comprising a self-powered power supply drive circuit and a drive tube, wherein the self-powered power supply drive circuit further comprises:

a charging detection circuit, which is connected with an energy storage circuit, and is configured to detect a power supply voltage of the energy storage circuit and to generate a self-charging signal when the power supply voltage is smaller than a self-charging threshold;
a current sampling switch tube, which is connected with an output terminal of the drive tube, wherein an input terminal of the drive tube is connected with an input power supply and the output terminal of the drive tube is grounded through the current sampling switch tube;
a charging switch tube, wherein an input terminal of the charging switch tube is connected between the drive tube and the current sampling switch tube, and an output terminal of the charging switch tube is connected with the energy storage circuit;
a sampling circuit, wherein an input terminal of the sampling circuit is connected between the drive tube and the current sampling switch tube to acquire a current which flows from the drive tube to the current sampling switch tube for generating a sampled voltage; and
a control circuit, which is connected with an output terminal of the sampling circuit to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;
wherein, each time the control circuit enters the switching-on cycle, if the control circuit fails to receive the self-charging signal, the control circuit is configured to be in a first switching-on control state after entering the switching-on cycle, wherein the first switching-on control state represents switching on the current sampling switch tube and switching off the charging switch tube;
wherein, each time the control circuit enters the switching-on cycle, if the control circuit receives the self-charging signal, the control circuit is configured to be in a first switching-on control state at an early stage after entering the switching-on cycle, and to be switched to a second switching-on control state in a later pre-switching-off stage to use a current which flows through the drive tube during the pre-switching-off stage to charge the energy storage circuit; wherein the pre-switching-off stage represents a period of the switching-on cycle which is from starting driving the drive tube to completely switching off the drive tube; the second switching-on control state represents switching off the current sampling switch tube and switching on the charging switch tube.

12. The self-powered power supply drive chip according to claim 11, wherein further comprising:
a current input circuit, which is connected with a control terminal of the drive tube and is configured to input a drive current to switch on the drive tube; and
a discharging circuit, which is connected with the control terminal of the drive tube and is configured to discharge the control terminal of the drive tube;
wherein, each time the control circuit enters the switching-on cycle, if the control circuit fails to receive the self-charging signal, the control circuit is specifically configured to be in the first switching-on control state after entering the switching-on cycle, to switch off the current input circuit to stop driving the drive tube when the sampled voltage reaches a first reference voltage, and to switch off the current sampling switch tube and synchronously control the discharging circuit to discharge to forcibly and completely switch off the drive tube to enable the drive tube to enter the switching-off cycle when the sampled voltage continues to increase to a second reference voltage;

wherein, each time the control circuit enters the switching-on cycle, if the control circuit receives the self-charging signal, the control circuit is specifically configured to be in the first switching-on control state at an early stage after entering the switching-on cycle, and to record a time, which is costed by the sampled voltage to increase from a third reference voltage to the first reference voltage, as a charging reference duration of a current switching-on cycle, and to acquire a charging execution duration based on the charging reference duration, to switch off the current input circuit to stop driving the drive tube when the sampled voltage reaches the first reference voltage, and to switch to the second switching-on control state and start timing at a same time when stop driving the drive tube, and to switch off the charging switch tube and synchronously control the discharging circuit to discharge to forcibly and completely switch off the drive tube to enable the drive tube to enter the switching-off cycle when the timed time reaches the charging execution duration.

13. The self-powered power supply drive chip according to claim 12, wherein the charging execution duration and the charging reference duration satisfy following equation:

$$(Vref2-Vref1)/tcharge=(Vref1-Vref3)/t1;$$

wherein t1 represents the charging reference duration, tcharge represents the charging execution duration, Vref1 represents the first reference voltage, Vref2 represents the second reference voltage, and Vref3 represents the third reference voltage.

14. The self-powered power supply drive chip according to claim 11, wherein further comprising a power supply direct-charging circuit, which is connected between the input terminal of the drive tube and the energy storage circuit, and is configured to directly take electrical power from the input power supply to charge the energy storage circuit until the power supply voltage is larger than a chip startup threshold, and to directly take electrical power from the input power supply to charge the energy storage circuit and guarantee that the power supply voltage is larger than the chip startup threshold when an operation of the drive tube cannot satisfy a self-powered demand.

15. The self-powered power supply drive chip according to claim 12, wherein the drive tube is a Darlington transistor, which comprises a primary transistor and a secondary transistor, wherein the discharging circuit comprises a first discharging switch and a second discharging switch; wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

16. The self-powered power supply drive chip according to claim 15, wherein the current input circuit comprises a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

17. The self-powered power supply drive chip according to claim 15, wherein the control circuit comprises a first PWM comparator, a second PWM comparator, a third PWM comparator and a logic circuit, wherein:

one input terminal of the third PWM comparator is connected with the third reference voltage, and the other input terminal of the third PWM comparator is connected with the output terminal of the sampling circuit, wherein the third PWM comparator is configured to output a third trigger signal when the sampled voltage increases to the third reference voltage;

one input terminal of the first PWM comparator is connected with the first reference voltage, and the other input terminal of the first PWM comparator is connected with the output terminal of the sampling circuit, wherein the first PWM comparator is configured to output a first trigger signal when the sampled voltage increases to the first reference voltage;

one input terminal of the second PWM comparator is connected with the second reference voltage, and the other input terminal of the second PWM comparator is connected with the output terminal of the sampling circuit, wherein the second PWM comparator is configured to output a second trigger signal when the sampled voltage increases to the second reference voltage;

the logic circuit is respectively connected with the first comparator, the second PWM comparator, the third PWM comparator, the charging detection circuit, the current sampling switch tube, the current input circuit and the discharging circuit.

18. The self-powered power supply drive chip according to claim 17, wherein:

each time the logic circuit enters the switching-on cycle, if the logic circuit fails to receive the self-charging signal, the logic circuit is configured to firstly switch on the current sampling switch tube and switch off the charging switch tube after entering the switching-on cycle, to switch off the current input circuit when receiving the first trigger signal, and to switch off the current sampling switch tube and synchronously control the discharging circuit to discharge when receiving the second trigger signal;

each time the logic circuit enters the switching-on cycle, if the logic circuit receives the self-charging signal, the logic circuit is configured to firstly switch on the current sampling switch tube and switch off the charging switch tube after entering the switching-on cycle, to start a first timing when receiving the third trigger signal, to end the first timing to acquire the charging reference duration when receiving the first trigger signal, to start a second timing, and synchronously switch off the current input circuit and the current sampling switch tube and switch on the charging switch tube at a same time when ending the first timing, and to switch off the charging switch tube and synchronously control the discharging circuit to discharge when the second timing reaches the charging execution duration.

19. The self-powered power supply drive chip according to claim 12, wherein the sampling circuit further comprises a controlled terminal which is connected with a controlled terminal of the current sampling switch tube, wherein both controlled terminals are connected with the control circuit, such that the control circuit is configured to synchronously control the sampling circuit to sample when controlling the current sampling switch tube to be switched on, and to synchronously control the sampling circuit to stop sampling when controlling the current sampling switch tube to be switched off.

20. The self-powered power supply drive chip according to claim 12, wherein the sampling circuit comprises an error amplifier, a sampling start switch, a first current mirror switch and a second current mirror switch which constitute a current mirror, a reference current switch, and a sampling resistor; wherein a first input terminal of the error amplifier is connected between the drive tube and the current sampling switch tube, and a second input terminal of the error amplifier is grounded through the sampling start switch, control terminals of the sampling start switch and the current sampling switch tube are connected with the control circuit, an output terminal of the error amplifier is connected with a control terminal of the reference current switch, an output terminal of the first current mirror switch is connected between the sampling start switch and the second input terminal of the error amplifier through the reference current switch, and an output terminal of the second current mirror switch is connected with a first terminal of the sampling resistor, wherein the first terminal of the sampling resistor is further connected with the control circuit, and a second terminal of the sampling resistor is grounded.

* * * * *